Oct. 30, 1962     J. A. VARNEY     3,060,836
INFUSION APPARATUS
Filed Feb. 23, 1960
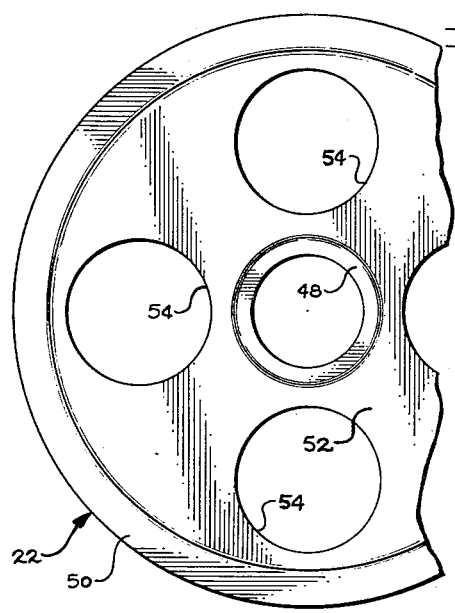
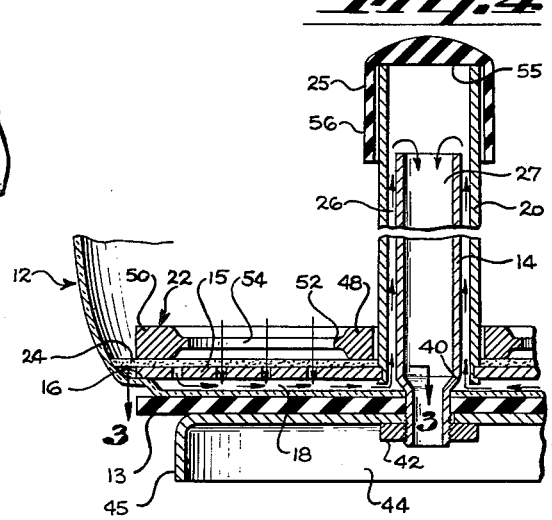
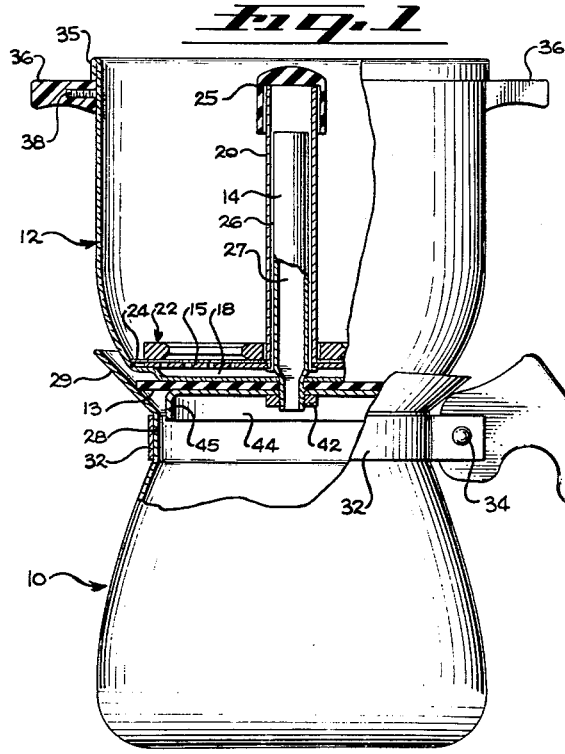
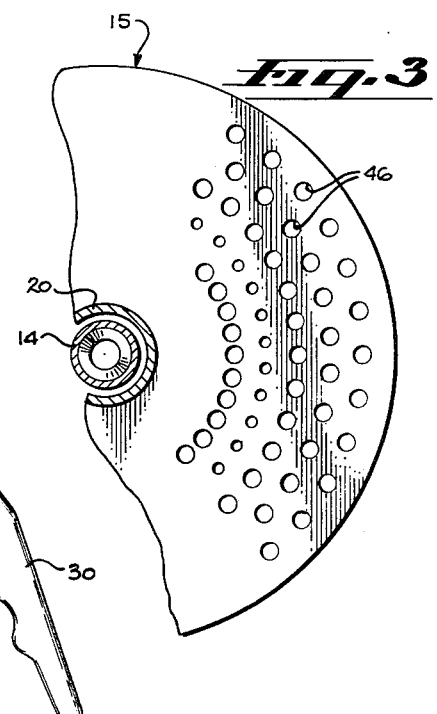
INVENTOR.
JUSTIN A. VARNEY
BY Jess M. Roberts
ATTORNEY

United States Patent Office 3,060,836
Patented Oct. 30, 1962

3,060,836
INFUSION APPARATUS
Justin A. Varney, Los Angeles, Calif., assignor to J. A. Varney Corporation, El Segundo, Calif., a corporation of California
Filed Feb. 23, 1960, Ser. No. 10,359
10 Claims. (Cl. 99—302)

This invention relates to an infusion apparatus and, more particularly, relates to a coffee maker of the type disclosed in the Varney et al. Patents 2,621,581 and 2,621,582, which disclosures are hereby incorporated into the present disclosure by reference.

Broadly described, this type of coffee maker comprises an open-top boiler receptacle together with a brewing receptacle that is equipped with a filter and has a bottom port. With the two receptacles separate from each other, a quantity of ground coffee is placed in the brewing receptacle and a quantity of water is heated to the boiling point in the boiler receptacle. The major portion of the boiling water is poured from the boiler receptacle into the brewing receptacle to start the initial steeping step of the operation. The brewing receptacle is then seated in the open top of the boiler receptacle in a sealing manner and the residual water in the boiler receptacle is heated to generate steam for the remainder of the steeping step. During the steeping step no liquid is permitted to flow from the upper brewing receptacle through its bottom port into the lower boiler receptacle and the boiler receptacle is vented to the atmosphere for release of steam therefrom to prevent an undue pressure rise. To terminate the steeping step and to initiate the filtration step, the steam filled boiler receptacle is removed from the heat source or, alternately, the heat source is turned off to cause the steam in the boiler receptacle to condense and form a vacuum. With the open top of the boiler receptacle sealed by the seated brewing receptacle, and with the boiler receptacle cut off from entrance of air from the atmosphere, the vacuum in the boiler receptacle creates a pressure differential between the two receptacles which causes the brewed coffee to be drawn through the filter and the bottom port of the under brewing receptacle into the lower boiler receptacle. The brewing receptacle is then removed to permit the finished coffee to be served from the boiler receptacle.

When the brewing receptacle is placed on the boiler receptacle for the steeping step three requirements must be met. One requirement is that the brewing receptacle seat in a fluid-tight manner as required to permit a vacuum to be developed in the boiler receptacle by the condensation of steam therein. A second requirement is that flow of liquid out of the brewing receptacle through its bottom port be prevented until the brewing receptacle is seated on the boiler receptacle and the vacuum is established. The third requirement is that steam be permitted to escape from the boiler receptacle to prevent the rise of pressure therein during the steeping step.

The first requirement of a fluidtight seal between the brewing receptacle and the boiler receptacle is usually met by employment of a rubber-like circumferential sealing member. The second requirement of preventing flow of filtrate downward through the bottom port of the brewing receptacle is commonly met by the provision of a valve to close the bottom port, the valve being spring-biased to remain closed until the closing bias is overcome by the subsequent vacuum-created pressure differential.

The third requirement of venting the boiler receptacle to the atmosphere has been met in some constructions by a special check valve incorporated in the boiler receptacle itself. In other instances this requirement has been met by constructing the circumferential sealing member between the two receptacles to function as a check valve.

These prior art expedients for meeting the second and third requirements have serious disadvantages. It is difficult to provide a spring-biased valve for the bottom port that is of simple construction, that is easily cleaned, and that functions properly and without leakage over a long service life. Foreign particles lodge in such a valve only too easily. For effective sealing action at the low pressures involved, soft resilient rubber is usually employed in the construction of such a valve and such material tends to lose its shape and effectiveness for valve operation with the passage of time.

Problems arise in the provision of a spring-biased check valve to vent the boiler receptacle to the atmosphere. If the equivalent of such a vent valve is provided by the circumferential sealing member around the bottom of the brewing receptacle other difficulties arise. The rubber-like material of the circumferential member may maintain its sealing effectiveness indefinitely but it loses its efficiency for valving action by deformation and deterioration with the passage of time. A further disadvantage is that the venting of steam from the joint between the brewing receptacle and the boiler receptacle often causes annoying vibrations and dancing of the brewing receptacle even to the extent of alarming persons using the device.

A primary object of the present invention is to avoid these disadvantages. One specific object is to construct the brewing receptacle as a unitary assembly to carry out the above-mentioned three requirements. Another object is to meet these requirements by using only one moving part and to avoid the use of a spring loaded valve or any other type of valve to close the bottom port in the brewing receptacle. Still another object is to provide a simple construction which permits full exposure of all parts for cleaning.

A further object is to provide an exceedingly simple means to break a residual vacuum in the boiler receptacle to permit the two receptacles to be readily separated after the brewing operation is completed.

A still further object is to provide a structurally simple filter assembly that is easy to assemble and disassemble and may be readily lifted out of the brewing receptacle.

The first requirement for a seal between the two receptacles is met by a simple rubber-like structure that is not complicated by the incorporated of any valve means whatsoever. For this purpose a simple disk of rubber-like material is preferred, the disk being releasably mounted on the bottom of the brewing receptacle together with a base member for supporting the brewing receptacle on a flat surface.

The second requirement of preventing flow of filtrate out through the bottom port of the brewing receptacle until the steeping step is completed is achieved by mounting a standpipe in the brewing receptacle to extend upward from the bottom port to a given level that is at least as high as the maximum liquid level desired in the brewing receptacle. To permit flow of the filtrate down through the standpipe in response to the vacuum in the boiler receptacle, a structure is added to the standpipe to form therewith a passage having an up leg and a down leg. The up leg of the passage extends from below the filter in the brewing receptacle to the top of the standpipe and the standpipe itself serves as the down leg. This arrangement eliminates any need whatsoever for a spring-biased valve or any other type of valve for the bottom port of the brewing receptacle.

The third requirement of providing a vent for escape of steam from the boiler receptacle is met by a simple gravity biased check valve incorporated in the aforementioned passage. For this purpose the passage structure may include a tubular port on which a closure cap rests in a loose manner. This loose closure cap is the only moving part in the whole device.

To make the syphon passage structurally simple and fully accessible for cleaning, a second outer standpipe surrounds the first mentioned standpipe from the bottom closure to form therewith an annular space which serves as the up leg of the aforementioned passage. The upper end of this second outer standpipe forms the tubular port that is covered and normally closed by the loose closure cap.

The loosely mounted closure cap also serves as a convenient manual means to break a residual vacuum in the boiler receptacle. In the preferred embodiment of the invention, the closure cap is a rubber-like member that may be simply squeezed by finger pressure to break the residual vacuum.

The simple removable filter assembly includes a perforated plate that rests inside the brewing receptacle in a removable manner in a position slightly above the bottom of the brewing receptacle to form therewith what may be termed a filtrate compartment. This perforated plate is apertured to clear the inner standpipe and is fixedly attached to the outer standpipe as the sole support of the outer standpipe. A filter sheet is held against the upper face of the perforated plate by a suitable means which may comprise simply an annular weight of open construction. The outer standpipe serves as a handle for removing the whole filter assembly comprising the perforate plate, the filter sheet and the annular weight. The removal of this assembly fully exposes the inner standpipe for cleaning.

The various features and advantages of the invention may be understood from the following detailed description considered with the accompanying drawing.

In the drawing, which is to be regarded as merely illustrative:

FIG. 1 is a view partly in side elevation and partly in section illustrating the presently preferred embodiment of the invention;

FIG. 2 is a fragmentary plan view of the annular weight of open construction that holds the filter sheet in position;

FIG. 3 is a fragmentary plan view of the perforated plate that supports the filter sheet; and FIG. 4 is an enlarged portion of the structure shown in FIG. 1.

The principal parts of the illustrated embodiment of the invention include: a boiler receptacle, generally designated 10; a brewing receptacle, generally designated 12; a rubber-like member 13 to serve as a seal between the brewing receptacle and the boiler receptacle when the brewing receptacle is seated thereon; an inner tube or standpipe 14 extending upward from a bottom port in the brewing receptacle to a given upper level which is the maximum level for liquid in the brewing receptacle; a perforated disk 15 which normally rests on an inner circumferential shoulder 16 of the brewing receptacle near the bottom thereof to form therewith a filtrate compartment 18, the perforated disk being centrally apertured to clear the inner tube or standpipe 14; an outer tube or standpipe 20 carried by the perforated disk 15 and extending upward from the central aperture of the perforated disk to a point above the inner tube or standpipe 14; an annular weight 22 of open construction to hold down a replaceable centrally apertured filter sheet 24 on the upper surface of the perforated disk 15, and a closure member or check valve member 25 in the form of a rubber-like cap resting on the upper end of the outer tube or standpipe 20.

As may be seen in FIG. 4, the two standpipes 14 and 20 form a syphon having an annular up leg passage 26 from the filtrate compartment 18 through the bottom port of the brewing receptacle and having a down leg passage 27 formed by the inner standpipe 14. The closure member 25 serves as a check valve to open this passage to the atmosphere for pressure relief, the check valve closing tightly in response to a vacuum condition in the passage.

The boiler receptacle 10 is a flask which may be made of metal or heat resistant glass and is formed with a cylindrical neck 28 and a flared pouring rim 29. In a well known manner, a suitable handle 30 is mounted on the boiler receptacle 10 by means of a split metal band 32, the opposite ends of which are attached to the handle by a suitable fastener means 34 such as a rivet.

The brewing receptacle 12 is also a flask made of suitable material such as metal, glass or plastic. In this instance the brewing receptacle is made of a thin metal such as aluminum with the metal folded to form a rim 35. In the construction shown, the brewing receptacle 12 is provided with a pair of diametrically opposite handles 36 that are secured by suitable screws 38.

The inner tube or standpipe 14 is reduced in diameter at its lower end to extend through the bottom port of the brewing receptacle 12 and to form a circumferential shoulder 40 to engage the rim of the bottom port from the inside. The lower end of the inner tube or standpipe 14 is threaded to receive a retaining nut 42. The lower end of the inner standpipe 14 may extend through the previously mentioned rubber-like sealing member 13 and may also extend through a base member 44 so that tightening the retaining nut 42 not only rigidly positions the inner standpipe inside the brewing receptacle but also anchors the sealing member 13 and the base member 44 to the bottom of the brewing receptacle. The base member 44 that is shown in the drawing is a sheet metal disk with a downwardly extending peripheral flange 45 and may serve to support the brewing receptacle 12 upright on any suitable flat surface when the brewing receptacle is separated from the boiler receptacle 10. The flange 45 is dimensioned to fit into neck 28 of boiler receptacle 10 in a loose telescoping relationship whereby the brewing receptacle 12 is automatically positioned centrally and therefore substantially in a level attitude whenever it is resting on the boiler receptacle 10.

Since the sealing member 13 is a simple centrally apertured flat disk of a suitable elastomer it is inexpensive and easy to fabricate. It readily forms a seal by functioning as a flexible circumferential lip in contact with the flared rim 29 of the boiler receptacle 10. The sealing pressure of the flexible lip increases in response to a vacuum in the boiler receptacle, a substantial marginal portion of the lip being free and exposed for this purpose. If it is ever desirable to replace the sealing member 13 it may be removed by simply loosing the retaining nut 42. A feature of the invention is that the base member 44 not only serves its primary purpose but also serves as means to retain and reinforce the sealing member 13.

The perforated filter-supporting disk 15 may have a pattern of concentric rows of holes 46 as indicated in FIG. 3. The lower end of the outer tube or standpipe 20 may be rigidly mounted in the central aperture of the perforated disk 15 in the manner shown in FIG. 4 with the metal of the inner tube or standpipe peened or spun against the underside of the perforated disk.

It is to be understood that any suitable means may be employed to hold the filter sheet 24 in position on the perforated disk 15. The annular weight 22 that is preferred for this purpose has a thickened hub portion 48 and a thickened rim portion 50 for contact with the filter sheet, these two portions being interconnected by a thin radial web 52. The thin web 52 is spaced above the filter sheet and is provided with large circular apertures 54 to make the weight of open construction for free passage of liquid therethrough.

The closure member or check valve member 25 may be a one-piece cap or a suitable rubber-like material which is formed with an inner flat surface 55 to rest on the upper end of the outer tube or standpipe 20 and is further formed with a downwardly extending cylindrical skirt 56 which surrounds the upper portion of the outer tube or standpipe. The inside diameter of the cylindrical skirt 56 is appreciably larger than the outside diameter of the outer tube or standpipe 20 to provide adequate circumferential clearance for flow of air or steam between the skirt and the standpipe.

The manner in which the invention serves its purpose may be readily understood from the foregoing description. In preparation for a brewing operation, the two receptacles 10 and 12 are separated. A central apertured filter sheet 24 is placed on the perforated disk 15 in the brewing receptacle 12 and weighed down by the annular weight 22 and a quantity of ground coffee is placed on the filter sheet and the annular weight. The desired quantity of water is brought to a boil in the boiler receptacle 10. A major portion of the boiling water in the boiler receptacle 10 is poured into the brewing receptacle 12 onto the ground coffee, a residual quantity of the boiling water being retained in the boiler receptacle for the subsequent generation of steam.

The brewing receptacle 12 is then seated on the boiler receptacle 10 with the rubber-like member 13 forming an effective seal between the two receptacles. The boiler receptacle 10 with the brewing receptacle 12 seated thereon is then heated to generate steam to serve for creating a vacuum for the final filtration step, this heating operation being prolonged for as long a period as required for the initial steeping step. During this period, excess steam escapes from the boiler receptacle 10 up through the inner tube or standpipe 14 and lifts the closure cap 25 to pass into the atmosphere. The liquid in the brewing receptacle 12 is below the level of the top rim of the inner tube or standpipe 14 and therefore is as effectively retained in the brewing receptacle as if the bottom port of the brewing receptacle were actually closed.

It is to be noted that the closure cap 25 yields by lifting at a pressure sufficiently low to keep the pressure in the filtrate compartment 18 from unseating the filter assembly including the annular weight 22. For this purpose, the resistance to unseating of the filter divided by the area of the filter in the filtrate compartment must be greater than the resistance to lifting movement of the closure cap divided by the area of the closure cap that is exposed to the interior of the standpipe 14.

The steeping step is terminated simply by removing the stacked receptacles from the heat source or by turning off the heat source to permit the steam to condense in the boiler receptacle 10. The vacuum created by the condensation of the steam in the boiler receptacle 10 results in a pressure differential between the two receptacles which acts across the passage having the up leg and down leg. The pressure differential forces the infusion through the filter sheet 24 into the filtrate compartment 18 and up the annular space or up leg 26 between the two standpipe tubes to spill into the inner standpipe tube 14 for flow downward through the down leg 27 into the boiler receptacle 10. When both legs of the passage are filled with liquid a syphon action is created to reinforce the pressure differential that is created by the vacuum. Obviously the syphon action is not necessary and therefore the down leg 27 need not be longer than the up leg 26.

Since the filter sheet 24 tends to clog up with solids, a residual vacuum is usually retained in the boiler receptacle 10 to maintain a slight pressure differential which may make it difficult to remove the brewing receptacle 12 from the boiler receptacle. This residual vacuum may be destroyed by tilting the closure cap 25 to admit air from the atmosphere into the upper end of the outer standpipe 20. It is usually more convenient simply to pinch the rubber-like closure 25 and thereby deform the closure member for the same purpose. With the residual vacuum destroyed the brewing receptacle 12 may be readily removed to permit the boiler receptacle 10 to be handled for serving the brewed coffee.

An important feature of the invention is the manner in which the described construction facilitates cleaning operations. The filter assembly comprising the outer standpipe 20, the perforated disk 15, the annular weight 22 and the filter sheet 24 may be readily removed from the brewing receptacle by using the outer standpipe as a handle. The spent coffee grounds may then be simply flushed away by holding the assembly under a faucet. The filter assembly is then ready for re-use. If desired, the annular weight 22 may be completely removed for replacement of the filter sheet. The closure member 25 may be readily removed to permit cleaning the interior of the outer standpipe. The removal of the filter assembly not only fully exposes the bottom of the brewing receptacle for flushing or cleaning but also uncovers the inner standpipe 14 to make its interior fully accessible.

My description in specific detail of the selected embodiment of the invention will suggest various changes, substitutions and other departures from my disclosure within the spirit and scope of the appended claims.

I claim:

1. In an infusion device wherein an open-top boiler receptacle is provided to heat a liquid and a brewing receptacle removably seats on the boiler receptacle in a sealing manner to contain heated liquid together with a quantity of steeping solids for a brewing operation and has a filter to separate the infusion from the spent solids and has a bottom port for flow of the infusion into the boiler receptacle, the combination therewith of a passage connecting the interior of said brewing receptacle below said filter with said bottom port, said passage having an up leg and a down leg to said bottom port, said up leg extending to a level to hold back the heated liquid in the brewing receptacle in the absence of said predetermined pressure differential; a port in said passage to vent to the atmosphere, said port being at an elevated location to be above the liquid level in the receptacle; and check valve means to prevent flow of atmospheric air into said passage through said port.

2. A combination as set forth in claim 1 in which said vent port is at the upper end of the structure of said up leg of the passage and in which the check valve comprises a closure member on said upper end of the passage member.

3. A combination as set forth in claim 1 in which said passage is formed by a first tube and a second tube surrounding the first tube and said vent port is formed by the upper end of said second tube and in which the check valve comprises a closure member resting removably on said upper end of the second tube.

4. A combination as set forth in claim 3 in which said closure member is an elastomer body with a downwardly extending circumferential skirt surrounding the upper end of said second tube, said skirt being larger in inside diameter than the outside diameter of the second tube.

5. In an infusion device wherein an open-top boiler receptacle is provided to heat water and a brewing receptacle removably seats on the boiler receptacle in a sealing manner to contain heated water below a given level together with a quantity of steeping solids for a brewing operation and has a filter to separate the infusion from the spent solids and has a bottom port for flow of the infusion into the boiler receptacle, the combination therewith of a tube inside said brewing receptacle extending upward from said port to said level to prevent drainage of the infusion through the port during the brewing operation; a tube enclosing said tube and extending downward from above said given level to the interior of the brewing receptacle below said filter, said enclosing tube having an upper vent opening; and a check valve on the outer tube to prevent flow of atmospheric air into the tube through said vent opening.

6. A combination as set forth in claim 5 in which said check valve is made of yielding elastomer material whereby it may be manually deformed to break a vacuum inside the outer tube.

7. A combination as set forth in claim 5 in which said enclosing tube is open at its upper end and said check valve is a closure member which rests thereon to prevent the intrusion of atmospheric air but opens when the fluid pressure inside the enclosing tube exerted upward on the closure member exceeds the weight of the closure member.

8. A combination as set forth in claim 7 in which said closure member is a cap member with an inside diameter exceeding the outside diameter of the upper end of the enclosing tube whereby the closure member may be lifted to break a vacuum in the enclosing tube.

9. In an infusion device of the character described, the combination of: an open-top boiler receptacle to heat a quantity of water; a brewing receptacle to receive the heated water and having a shallow base structure seated on the open top of said boiler receptacle for supporting the brewing receptacle thereon, said base structure being adapted to support the brewing receptacle in upright position on a flat surface, when the brewing receptacle is removed from the boiler receptacle; means to seal the juncture between the boiler receptacle and the brewing receptacle supported thereon; a syphon structure inside said brewing receptacle having a down leg with a minor end portion of the down leg extending through the base structure for communication with the interior of the boiler receptacle, said base structure extending below said end portion of the down leg to position said end portion above said flat surface when the brewing receptacle is on the flat surface; vent means inside the brewing receptacle at an elevated position to be above the level of heated water therein to vent the interior of the boiler receptacle to the atmosphere for release of heated air therefrom when the brewing receptacle is mounted on the boiler receptacle; and a check valve to prevent inward flow of atmospheric air to said boiler receptacle through said vent means.

10. A combination as set forth in claim 9 in which said vent means comprises an opening in said syphon structure.

References Cited in the file of this patent

UNITED STATES PATENTS

| | | |
|---|---|---|
| 627,885 | Viser | June 27, 1899 |
| 1,259,471 | Bachelder | Mar. 19, 1918 |
| 2,167,354 | Gavin | July 25, 1939 |
| 2,232,614 | Kopf | Feb. 18, 1941 |
| 2,621,581 | Varney | Dec. 16, 1952 |
| 2,621,582 | Varney | Dec. 16, 1952 |
| 2,838,764 | Smith | June 17, 1958 |